US010003901B1

(12) United States Patent
Slick (10) Patent No.: US 10,003,901 B1
(45) Date of Patent: Jun. 19, 2018

(54) GRAPHICAL MONITOR MIXING SYSTEM THAT USES A STAGE PLOT TO CREATE SPATIALLY ACCURATE SOUND

(71) Applicant: Audio Fusion Systems, LLC, Austin, TX (US)

(72) Inventor: Kevin R. Slick, Austin, TX (US)

(73) Assignee: Audio Fusion Systems, LLC, Austin, TX (US)

( * ) Notice: Subject to any disclaimer, the term of this patent is extended or adjusted under 35 U.S.C. 154(b) by 0 days. days.

(21) Appl. No.: 15/454,075

(22) Filed: Mar. 9, 2017

Related U.S. Application Data (60) Provisional application No. 62/310,724, filed on Mar. 20, 2016.

(51) Int. Cl.
   *H04S 7/00* (2006.01)
   *H04S 3/00* (2006.01)
   *G06F 3/16* (2006.01)
   *H04W 84/12* (2009.01)

(52) U.S. Cl.
   CPC ............... *H04S 7/30* (2013.01); *G06F 3/165* (2013.01); *H04S 3/002* (2013.01); *H04S 2400/13* (2013.01); *H04S 2400/15* (2013.01); *H04W 84/12* (2013.01)

(58) Field of Classification Search
   CPC ........ H04S 7/30; H04S 3/008; H04S 2400/11; H04S 2400/15; H04S 2400/01
   USPC ............... 381/2, 17, 74, 77, 81, 98, 56, 107
   See application file for complete search history.

(56) References Cited

U.S. PATENT DOCUMENTS

| | | | |
|---|---|---|---|
| 2009/0043410 A1* | 2/2009 | Evans | G10H 1/0025 700/94 |
| 2011/0096934 A1* | 4/2011 | Babarskas | H04R 1/10 381/58 |
| 2013/0010984 A1* | 1/2013 | Hejnicki | H04R 27/00 381/107 |
| 2014/0083278 A1* | 3/2014 | Dietz | H04R 5/027 84/466 |
| 2014/0303761 A1* | 10/2014 | Cockram | G06F 3/165 700/94 |

OTHER PUBLICATIONS

Klang:fabrik, Klang:vier User Manual/English, Klang:technologies GmbH, Aachen, Germany, 2014; V0.1.6-6-Oct-15; 16 pages.

* cited by examiner

*Primary Examiner* — Melur Ramakrishnaiah
(74) *Attorney, Agent, or Firm* — Meyertons, Hood, Kivlin, Kowert & Goetzel, P.C.; Lawrence J. Merkel (57) ABSTRACT

In an embodiment, a mix monitor system is provided in which a stage plot of the positions of the musicians and their instructions may be supplied. Based on the relative locations of a given musician who is monitoring the mix and the other musicians/instruments, the mix monitor system may generate a mix that incorporates modifications to make the sound appear to be three dimensional. That is, the source of the sound may be experienced by the musician as if the sound is being heard from the location of the musician/instrument.

19 Claims, 8 Drawing Sheets

GRAPHICAL MONITOR MIXING SYSTEM THAT USES A STAGE PLOT TO CREATE SPATIALLY ACCURATE SOUND

This application claims benefit of priority to U.S. Provisional Patent Application Ser. No. 62/310,724, filed on Mar. 20, 2016. The above application is incorporated herein by reference in its entirety. To the extent that anything in the above application conflicts with material expressly set forth herein, the material expressly set forth herein controls.

BACKGROUND

Technical Field

Embodiments described herein are related to electronic devices in a music monitor system for mixing music channels for a musician participating in the performance of the music.

Description of the Related Art

When performing live music, the musicians in a band generally need to be able to hear the music they are producing. In an amplified music environment such as a concert hall, the music is being projected to the audience from an area generally in front of the musicians (and possibly to either side), which prevents the musicians from hearing the music effectively.

Typical music monitors include one of two types: fixed mixers that are connected to speakers in front of the musicians and facing the musicians, or fixed mixers connected to a wired earphone. In either case, the monitored music typically sounds unnatural to the musicians, because the source of the sounds is not spatially correct with respect to the positions of the instruments and other musicians on the stage.

SUMMARY

In an embodiment, a mix monitor system is provided in which a stage plot of the positions of the musicians and their instructions may be supplied. Based on the relative locations of a given musician who is monitoring the mix and the other musicians/instruments, the mix monitor system may generate a mix that incorporates modifications to make the sound appear to be three dimensional. That is, the source of the sound may be experienced by the musician as if the sound is being heard from the location of the musician/instrument.

BRIEF DESCRIPTION OF THE DRAWINGS

The following detailed description makes reference to the accompanying drawings, which are now briefly described.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Overview

Figure 1:
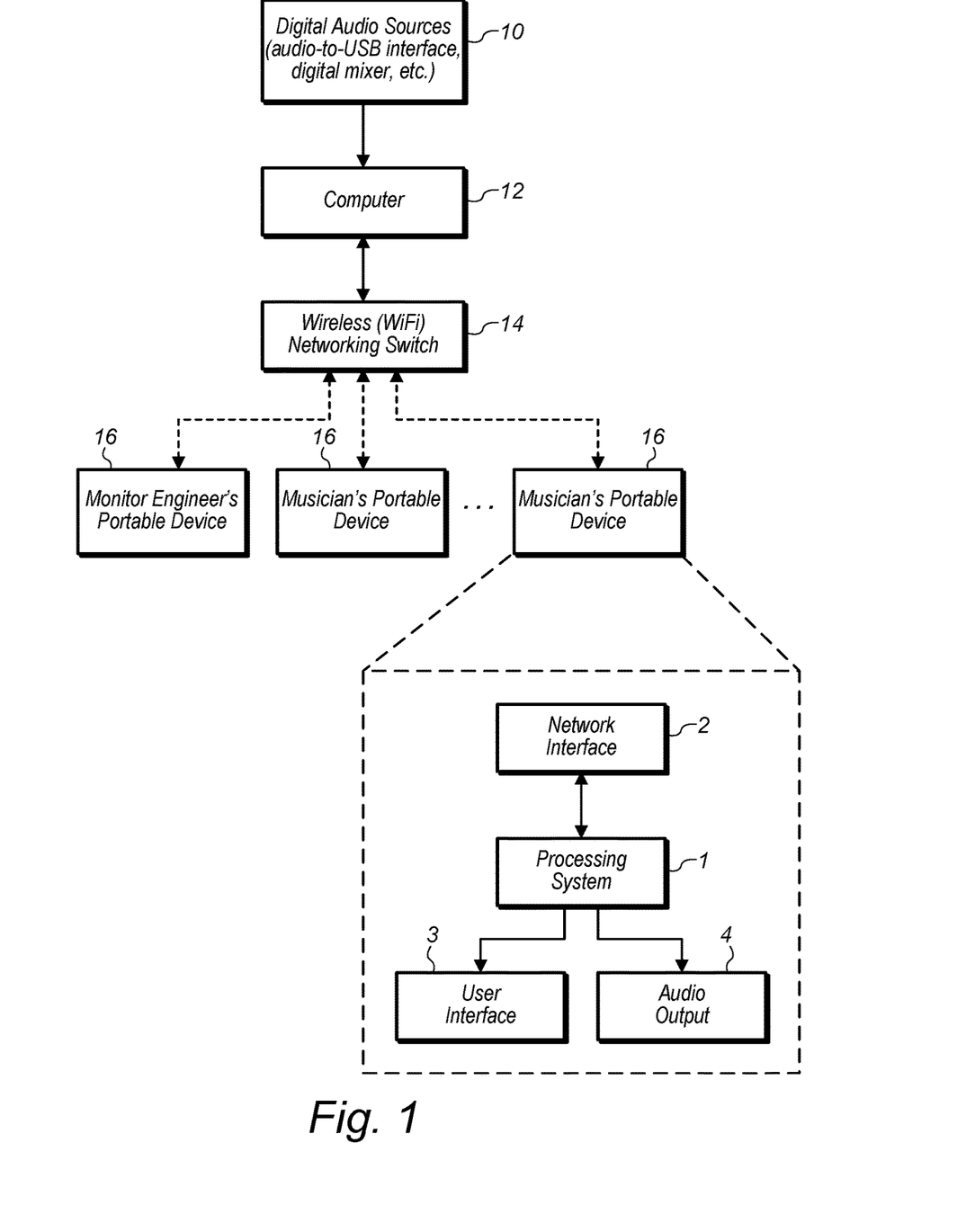
FIG. 1 is a block diagram of one embodiment of a system for providing personalized audio mixes—often referred to as "monitor mixes"—to each musician via a wireless network during a performance or recording session.

FIG. 1 is a block diagram of one embodiment of a system for providing personalized audio mixes to each musician during a performance, rehearsal, recording session, etc.

Each digital audio source 10 may provide a multichannel, digital audio stream to the computer 12, by connecting to one of the computer's digital inputs: USB, Firewire, Ethernet, etc. The digital audio sources 10 may include any sort of analog-to-digital converter, digital mixer, or other digital equipment that receives inputs from the band's instruments, microphones, recordings, etc. and provides multichannel digital audio output.

The computer 12 may combine the audio streams from the digital audio source(s) 10 and send them in packets to the wireless networking switch 14, which may then transmit them to each of the monitor engineer's and musicians' portable devices 16. Any type of computer 12 may be used (e.g. a laptop or desktop computer).

The wireless networking switch 14 may be connected using any networking technology—such as Ethernet, WiFi, or a combination—to the computer 12 and to each of the monitor engineer's and musicians' portable devices 16. If WiFi is used, any of the WiFi technology standards—such as 802.11n or 802.11ac—may be used.

The musician's portable devices 16 may add 3D effects to the audio per the 3D control messages sent from the monitor engineer's portable device 16, mix the multiple channels of audio into a stream of 2 channels, for stereo, and then play the 2-channel audio for the musician via the device's internal audio player.

The user (musician) may listen to the audio from the audio output (e.g., headphone jack) of the musician's portable device 16. A wired headphone may be used, or a wireless headphone connected to the mobile device using various wireless standards such as Bluetooth may be used. The musician's portable devices 16 may be any type of portable device that has standard digital networking capability and an audio output. The device 16 may include wearable mobile devices that may be attached to the user/musician or carried on or by the user/musician, such as smart devices. Smart devices may include, for example, personal digital assistants such as the iPod™, iPhone™, or Android devices. Smart devices may also include non-wearable devices such as and iPad™ or other tablet devices. The musician's portable devices 16 may also include laptop computers which may be arranged near the user/musician to permit manipulation of settings by the user/musician. The musician's portable devices 16 may also include specialized hardware designed for the purpose of monitor mixing. A musician's portable device 16 may be any device which is capable of operation without a direct connection to a wall outlet (e.g. on battery power drawn from a battery within the device), even though the device may be plugged in during use at some points.

The musician's portable device 16 may include one or more processors that may be configured to execute code, including an operating system and/or various application programs such as the programs described below. The processors and a memory system storing the code/data executed by the processor may be referred to as a processing system. The device may also include a display on which the user interfaces may be displayed and from which input may be accepted. For example, the display may be a touchscreen display that may be configured to display images generated by the device and that may be configured to detect user touches on the screen. The touchscreen may convey position and/or movement information to the device. Customized hardware devices used as the musician's portable device 16 may include physical input/output hardwire (e.g. knobs, switches, sliders, etc.). Generally, the display and user input hardware may be referred to as a user input/output interface. One of the musician's portable devices 16 in FIG. 1 is shown in exploded view to include the processing system 1, the network interface 2 to receive the multi-channel audio over the network, the user input/output interface 3, and the audio output 4. The processing system 1 is coupled to the network interface 2, the user input/output interface 3, and the audio output 4.

The musician's portable device 16 may further include WiFi circuitry configured to transmit and receive WiFi data packets, including the stream of digital audio packets transmitted by the computer 12. The mobile device 16 may still further include an audio system configured to play a stream of audio output from the Audio Engine Mixer described below (e.g. output to a headphone jack, on a speaker in the mobile device, etc.). Generally, the components of the device 16 may be coupled together (e.g. the WiFi circuitry, the user input/output interface, the processing system, and the audio system). The monitor engineer's portable device 16 may be similar to the musician's portable device 16 as described above. The monitor engineer's portable device 16 need not be the same as the musician's portable device 16. For example, the monitor engineer's portable device 16 may be an iPad or laptop, while the monitor engineer's device 16 may be a personal digital assistant.

Figure 2:
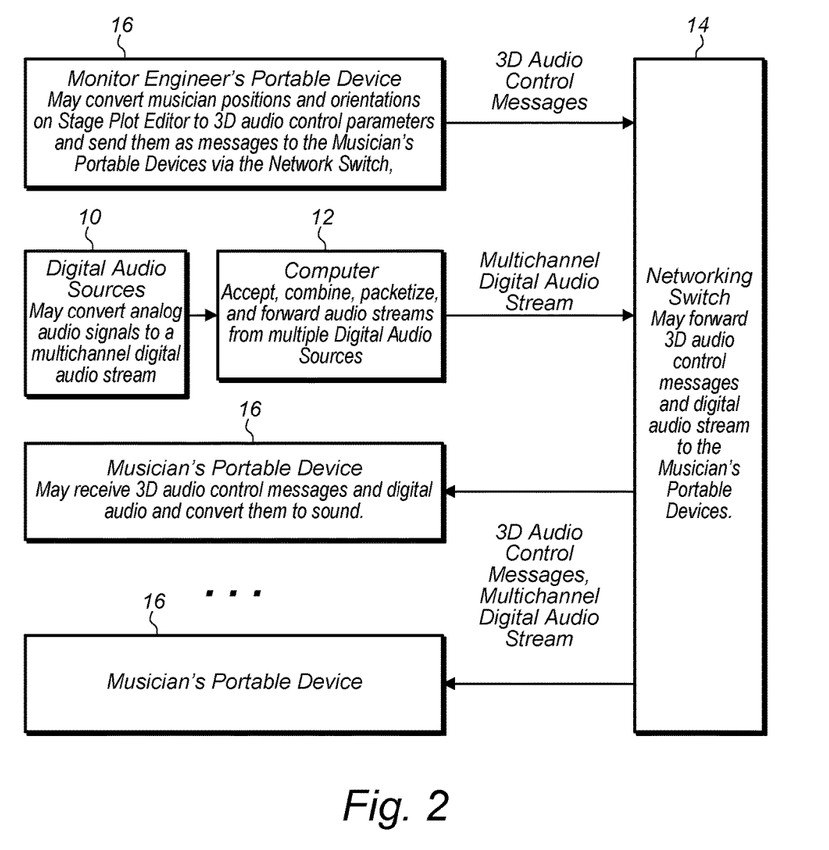
FIG. 2 is a flowchart illustrating one embodiment of the flow of multichannel digital audio packets and 3D audio control messages in a graphical monitor mixing system.

FIG. 2 is a diagram to illustrate one embodiment of the flow of digital audio through a graphical monitor mixing system.

The system may accept multichannel digital audio streams from multiple digital audio sources 10 and may combine them into packets of audio data suitable for low-latency transmission via modern computer networking media (e.g., Ethernet, WiFi) to a networking switch 14 and, ultimately, to musicians' portable devices 16 and the monitor engineer's portable device 16 (see below).

The computer 12 may employ any of the standard networking protocols, such as Transmission Control Protocol/Internet Protocol (TCP/IP), to take advantage of the robustness and quality of service such standards are designed to provide.

The networking switch 14 may forward multichannel digital audio packets from the computer 12 to the musicians' portable devices 16 and the monitor engineer's portable device 16, using WiFi or similar wireless networking medium.

The networking switch 14 may forward configuration and control packets to/from the computer 12, the musicians' portable devices 16, and the monitor engineer's portable device 16.

The networking switch 14 may be dedicated exclusively to use in the graphical monitor mixing system, to avoid unrelated congestion and interference, and thereby minimize packet loss and latency due to transmission delays.

The monitor engineer's portable device 16 may send messages, via the networking switch 14, to each of the musician's portable devices 16, to provide them 3D audio controls.

The musician's portable devices 16 may accept 3D audio control messages from the monitor engineer's portable device 16 and use those messages to control its mix of the digital audio stream being transmitted to it by the computer 12.

Human Interface

Figure 3:
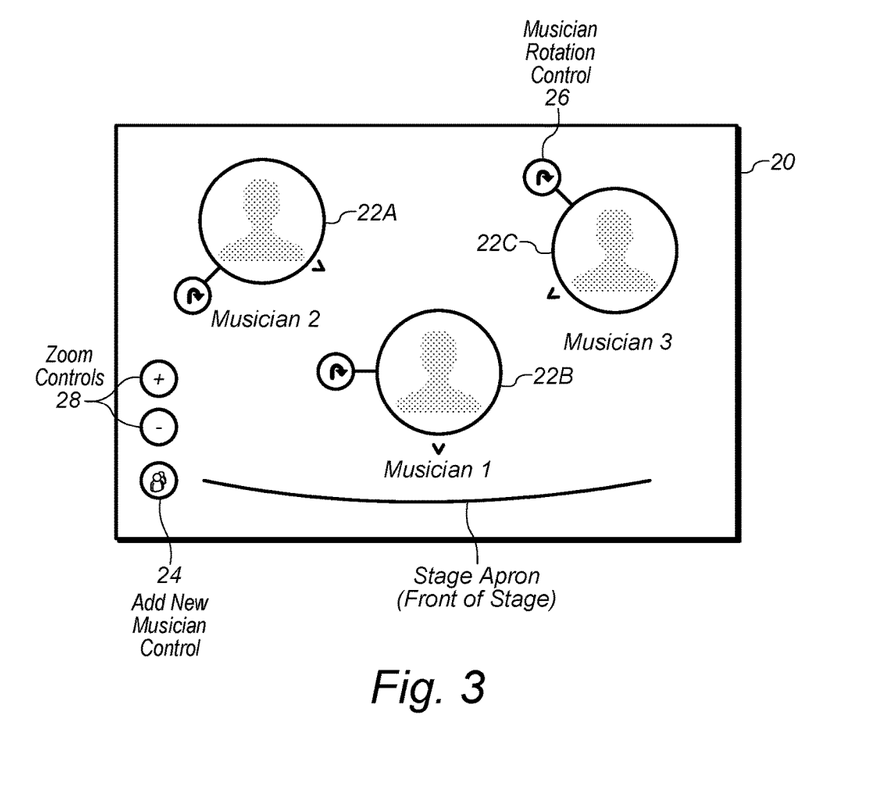
FIG. 3 is an illustration of one embodiment of audio mix controlling using a graphical user interface, representing a stage plot, on the Monitor Engineer's Portable Device.

FIG. 3 is an illustration of one embodiment of audio mix control using a graphical user interface, representing a stage plot 20, on the monitor engineer's portable device 16.

Using a graphical user interface, the monitor engineer may create a stage plot 20 that diagrams an overhead view of the relative positions and orientations (rotations) of each musician on the stage. For example, musicians 22A-22C are illustrated in FIG. 3.

A schematic symbol representing a musician may be created by using a control 24 (add new musician) on the user interface. Activating that control 24 would place a new instance of the musician symbol at an arbitrary location on the stage plot 20, and would provide a mechanism (such as a pop-up keyboard, not shown in FIG. 3) to enter a label for that musician.

The musician's symbols 22A-22C may be repositioned on the stage plot 20 by using any mechanism (e.g., mouse click and drag, finger tap and drag) for "dragging" graphical objects on a computer screen.

The musician's symbols 22A-22C may be rotated in place, using a rotation control 26 (see FIG. 3). This rotation is intended to represent the direction a musician is typically facing while on stage.

The rotation controls 26 may be used to set the angular orientation of each musician, used for computing relative rotation between musicians, which is used for computing 3D audio controls (stereo gain, stereo delay) for each channel in each musician's mix. The purpose for 3D sound is to aid in modelling the original acoustics of sound, to provide natural-sounding acoustics for the musician.

The zoom controls 28 may be used to provide the Monitor Engineer with control over the physical scale represented in the stage plot 20, and to provide a scale factor used for computing relative positions (distances) between musicians.

A scale grid may be displayed to provide the monitor engineer with a visual sense of the scale represented in the stage plot. The scale grid is shown in the background of the block 20 as dotted horizontal and vertical lines.

Figure 4:
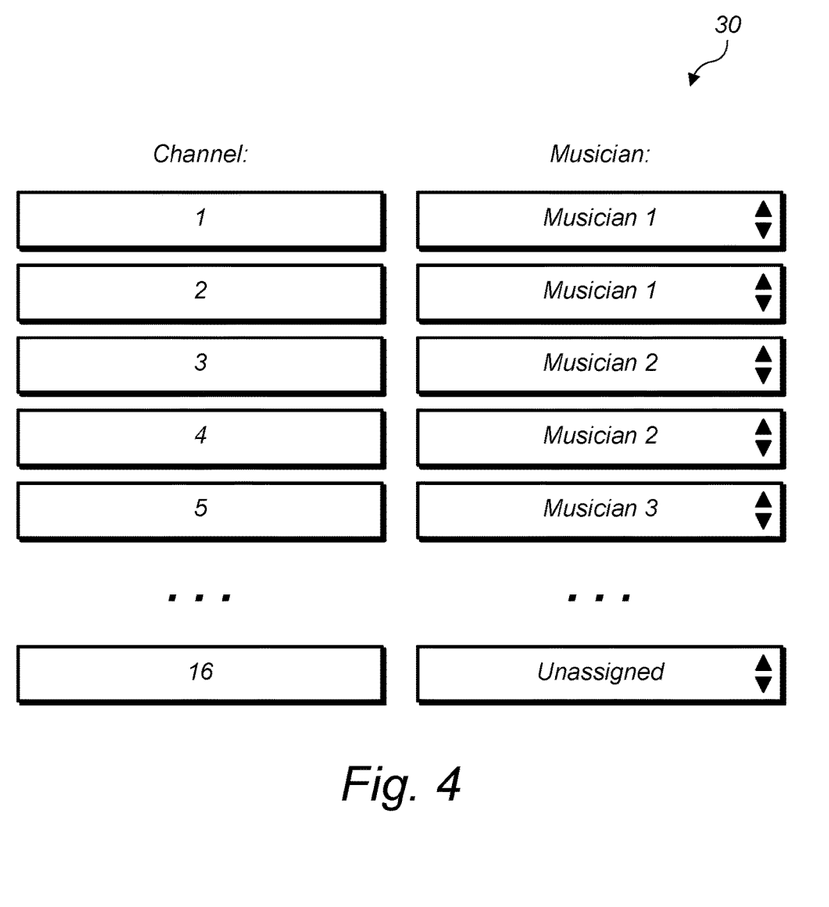
FIG. 4: is an illustration of one embodiment of a set of Channel Assignment Controls on the Monitor Engineer's Portable Device for assigning musicians to each of the digital audio channels in the system.

FIG. 4 is an illustration of one embodiment of a set of channel assignment controls 30 on the monitor engineer's portable device 16 for assigning musicians to each of the digital audio channels in the system.

The monitor engineer may select one musician, represented by one of the musicians 22A-22C created for use with the stage plot 20 (see FIG. 3), for each of the channels available in the current digital audio stream.

Figure 5:
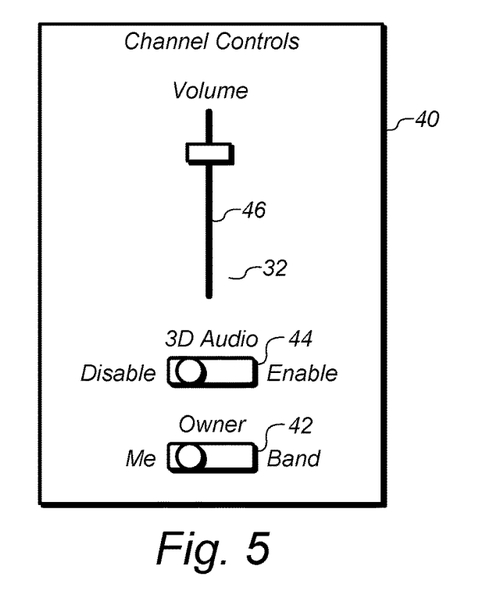
FIG. 5 is an illustration of one embodiment of a set of Channel Controls for assigning an individual channel to a musician, enabling or disabling 3D audio effects, and adjusting the channel's volume.

FIG. 5 is an illustration of one embodiment of a set of channel controls 40 for assigning an individual channel to a musician, enabling or disabling 3D audio effects, and adjusting the channel's volume.

The channel controls 40 may be displayed on the musician's portable device 16 when the musician has selected an update to the channel controls (e.g. from the home screen of an application that interacts with the other components of the system of FIG. 1, where the application is installed on the musician's portable device 16). One such set of controls 40 may exist for each channel of the digital audio stream. If the digital audio stream channel (e.g., channel 1) corresponding to the channel controls 40 is being contributed by the musician that is interacting with the controls 40, the musician may indicate that ownership of contribution by setting the owner control 42 to the Me position. Otherwise, the Band position may be selected. The position of the owner control 42 indicates to the musician's portable device which channels belong to which musician, and the audio mixer may use the channel ownership information when applying the correct Me/Band control level to the gain level calculations for the channel.

Thus, the channel controls 40 interface may provide the user/musician with the ability to define which channels are contributed by that user/musician (e.g. instrument(s) and/or microphone) and which channels are contributed by other band members. In combination with the master controls described below with regard to FIG. 6, the channel controls permit each user/musician to customize how much of the overall music is being played back to that user/musician, as well as relative volumes of the music. Each band member may have a different mix (since each band member may have different channels identified as "me" versus "band," and each band member may have different preferences with regard to relative levels of audio from "me" versus "band"). Furthermore, each band member may change his/her mix dynamically throughout the performance (e.g. using different mixes during different songs, or different mixes at different points during the song).

A 3D audio control 44 may be used to enable or disable 3D audio effects for the channel.

Using the slider control 46, the volume of the channel may be controlled from maximum (slider to the top as shown in FIG. 5) to minimum (slider to the bottom as shown in FIG. 5).

Figure 6:
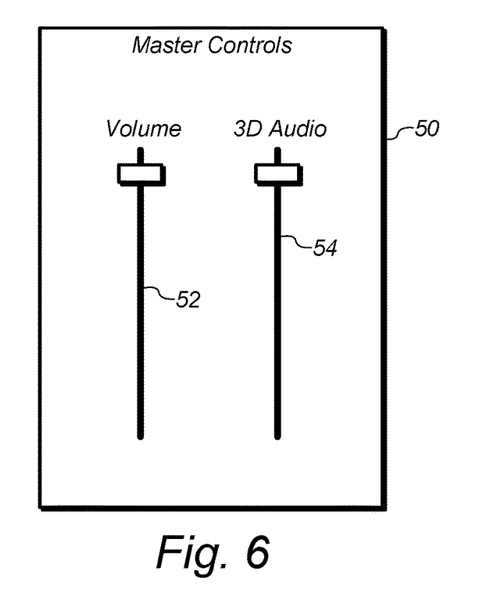
FIG. 6 is an illustration of one embodiment of a set of Master Controls for controlling the overall amount of 3D audio effects applied to a musician's audio mix.

FIG. 6 is an illustration of one embodiment of a set of master controls 50 for controlling the overall amount of 3D audio effects applied to a musician's audio mix.

The master controls 50 may be displayed on the musician's portable device 16 when the musician has selected an update to the master controls 50 (e.g. from the home screen of an application that interacts with the other components of the system of FIG. 1, where the application is installed on the musician's portable device 16).

The master slide control 52 may limit the overall output volume. That is, the volume of the mix as played by the device's audio system may be controlled using the master slide control 52. Increased volume may be obtained by sliding the master slide control 52 toward the top of the screen as shown in FIG. 6, and decreased volume may be obtained by sliding the master slide control 52 toward the bottom of the screen as shown in FIG. 6. Thus, the musician's portable device 16 may include a touchscreen in some embodiments.

The 3D audio control 54 may be used by the musician to limit the effect of the 3D audio control messages sent by the monitor engineer's portable device 16. Setting the control 54 to its minimum (e.g., all the way toward the bottom) eliminates the 3D audio effect, while setting it to its maximum enables the full effect.

Figure 7:
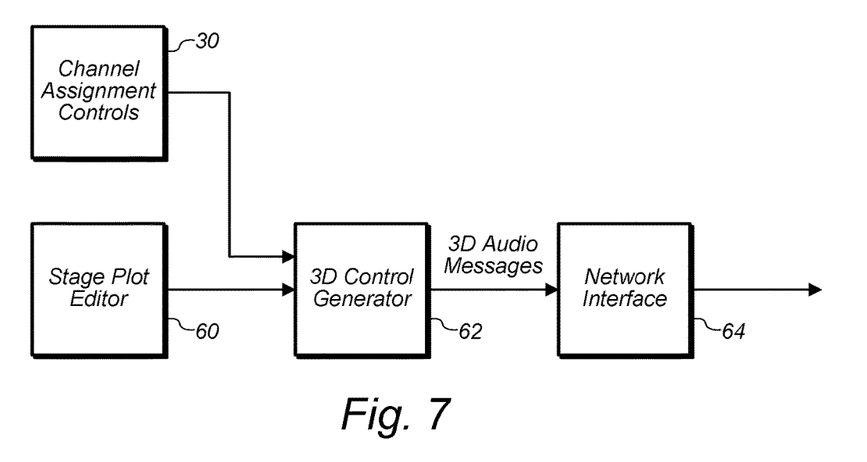
FIG. 7 is a flowchart illustrating operation of one embodiment of the translation of graphical stage plot representation to 3D audio control messages onboard the Monitor Engineer's Portable Device.

FIG. 7 is a flowchart illustrating operation of one embodiment of the translation of graphical stage plot representation to 3D audio control messages onboard the monitor engineer's portable device.

As illustrated in FIG. 7, the channel assignment controls 30 and the musician location and orientation information from the stage plot editor 60 may be provided to a 3D control generator 62, which may generate 3D audio control messages for transmission to the musician's portable devices 16 over the network interface 64.

Figure 8:
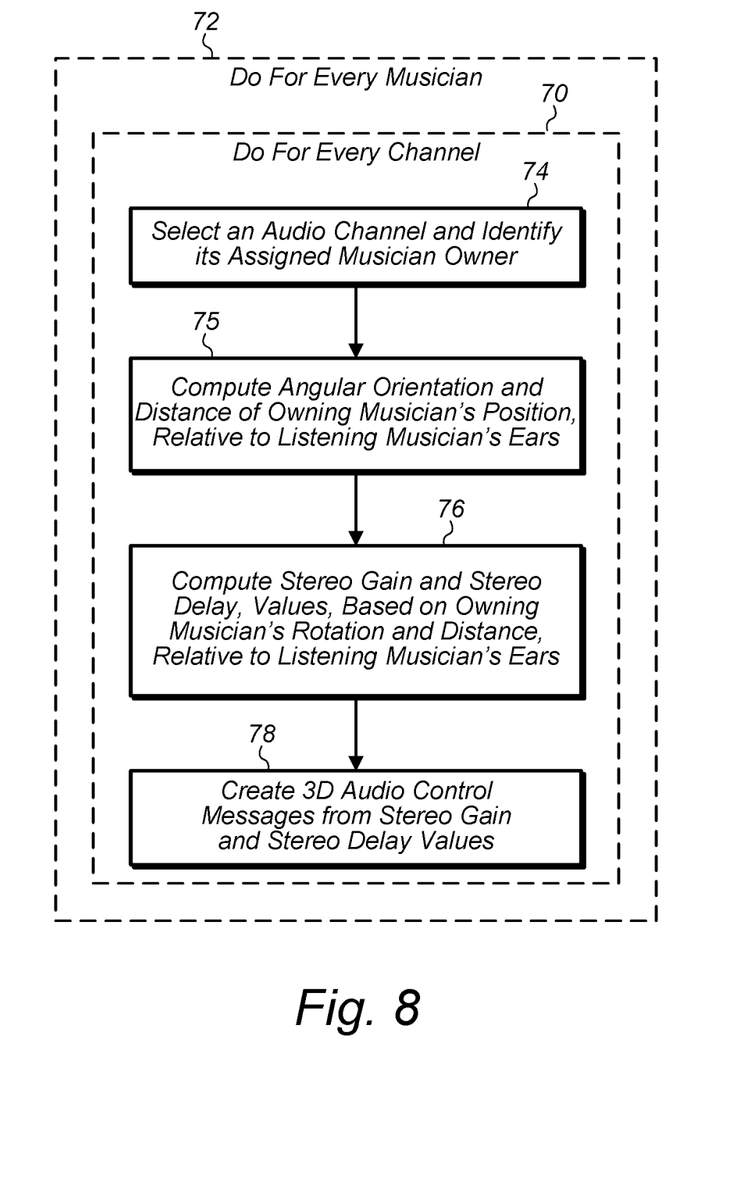
FIG. 8 is a flowchart illustrating operation of one embodiment of the translation of relative musician positions and orientations into 3D audio control messages onboard the Monitor Engineer's Portable Device.

FIG. 8 is a flowchart illustrating operation of one embodiment of the translation of relative musician positions and rotations into 3D audio control messages onboard the monitor engineer's portable device 16. It provides more details for the 3D control generator 62 shown in FIG. 7, for one embodiment.

As shown in the figure, 3D control messages may be computed for each channel (reference numeral 70) and for each musician (reference numeral 72). This may enable each channel of each musician's monitor mix to have its audio properties set so as to approximate the acoustic properties of the sounds being generated each musician, relative to every other musician, as if the sound were being transmitted acoustically, rather than electronically. The 3D control generator 62 may select and audio channel and identify the owner of the channel from the channel assignment controls 30 (block 74)

Computation of 3D control messages for a given audio channel may begin with computing the angular orientation and distance of the musician that is contributing the sound for that channel (sender), relative to the position and rotation of each of the other musicians (listeners) (block 75). Those computations may be calculated as follows:

Let the stage left/right and upstage/downstage positions be called the X and Y positions, respectively. For each listening musician:

$X$ distance from sender=Sender $X$ position–Listener $X$ position $Y$ distance from sender=Sender $Y$ position–Listener $Y$ position Relative rotation(sender's angular orientation from listener's front)=arctangent($Y$ distance/$X$ distance)–listening musician's rotation(measured in radians)

Based on the relative rotation, each listen musician's channel mix settings may be set as a linear value as shown in the table below (block 76). That is, where a range is shown for a gain or delay, the gain or delay is linearly scaled from the corresponding relative rotation. For example, if the relative clockwise rotation is 30 degrees, the right gain may be reduced by ⅓ of the range from 1.0 to 0.0, or 0.67, and the right delay range may increased by ⅓ of the range from 0.0 to 0.7, or 0.23. If the relative clockwise rotation is 45 degrees, the value at the center of both ranges will be output (0.5 and 0.35 respectively). The above calculation of relative rotation is in radians. However, the table below is expressed in degrees. The relative rotation may be converted to degrees, or the entries below may be expressed in radians, as desired.

Based on the relative rotation, each listening musician's channel mix settings may be set as a linear value within one of the following ranges:

| Relative Clockwise Rotation (degrees) | Left Gain Range | Right Gain Range | Left Delay Range (msec.) | Right Delay Range (msec.) |
| --- | --- | --- | --- | --- |
| 0-90 | 1.0 | 1.0 –> 0.0 | 0.0 | 0.0 –> 0.7* |
| 90-180 | 1.0 | 0.0 –> 1.0 | 0.0 | 0.7 –> 0.0 |
| 180-270 | 1.0 –> 0.0 | 1.0 | 0.0 –> 0.7 | 0.0 |
| 270-360 | 0.0 –> 1.0 | 1.0 | 0.7 –> 0.0 | 0.0 |

*Note that the delay may range from 0.0 to 0.7 milliseconds, based on the speed of sound and the nominal distance between human ears. This is only an approximation for the general population. In some embodiments, the range may be customized on a per-musician basis, based on their personal preferences (e.g. determined by trial and error).

The stereo gain and delay values may be further modified by the setting of the master 3D audio control 54 (FIG. 6) on the musician's portable device 16. Control messages indicating the stereo gain and stereo delay for the musicians' left and right channels may be generated and transmitted to the musician's portable device 16 (block 78).

Figure 9:
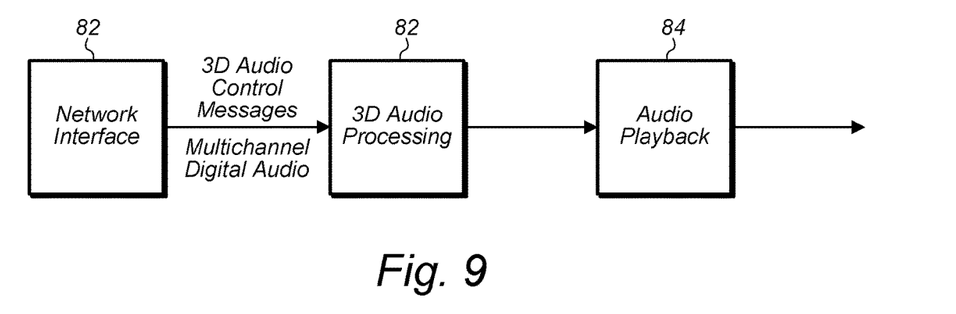
FIG. 9 is a flowchart illustrating operation of one embodiment of audio processing onboard the Musician's Portable Device.

FIG. 9 is a flowchart illustrating operation of one embodiment of audio processing onboard the musician's portable device 16. The network interface 80 may capture network packets for the musician's portable device 16 and provide the 3D audio control packets and multichannel digital audio packets to the 3D audio processing block 82.

The control positions for the master volume control 52, 3D audio control 54, and channel volume controls 42 may be a normalized value ranging from 0.0 to 1.0 representing a position of the slider control between the low end (0.0) and the high end (1.0).

The control positions and 3D audio control messages may be combined to form a gain level for each of N channels, as follows. (Channel n' indicates one of N channels in a multi-channel audio stream, where 'n'=1 through N.) Master Volume may be the unity gain volume indicated by the master slider control 52 on the master controls user interface (FIG. 6). The Channel n Volume may similarly be the unity gain volumes indicated by the channel slider control 46 for channel n (and me or band may be indicated by the owner control 42 for the channel).

Channel $n$ gain=Channel $n$ Volume×Master Volume

The Channel n gain may be further modified by the unity gain 3D Volume (indicated by the slider 54) if the 3D audio is enabled (by the 3D audio control 44 for channel n) and the channel is a band channel since there may be no 3D effect for a me channel (indicated by the owner control 42 for channel n)

Channel $n$ gain=Channel $n$ gain×3$D$ Volume

Additionally, if the channel is a band channel and 3D audio is enabled, each sample X for the channel may be separated into left and right stereo samples and the left and right gains for 3D audio may be applied:

Channel $n$ left sample=Channel $n$ gain×left gain×Sample[$X,n$]

Channel $n$ right sample=Channel $n$ gain×right gain×Sample[$X,n$]

Then Channel n left and right samples may be delayed by the left delay and right delay, respectively, if 3D audio is enabled.

For Me channels, once the channel's gain value has been calculated, it may be multiplied by each of the samples in the channel's audio stream, producing an attenuated value for each sample, X:

Attenuated sample[$X,n$]=Sample[$X$]×Channel $n$ gain

The attenuated samples for each me channel, 1 through N may be separated into left and right channels as well, and left and right channel stereo output may be generated by summing the delayed left and right channel samples for the band channels with the left and right samples for the me channels:

Output Left=Sum(Me Left Samples,delayed band left samples)

Output Right=Sum(Me Right Samples delayed band right samples).

The mixed digital audio stream may be the stream of output left and right samples, and may be provided to the audio playback 94 in the musician's portable device 16 for playback.

Figure 10:
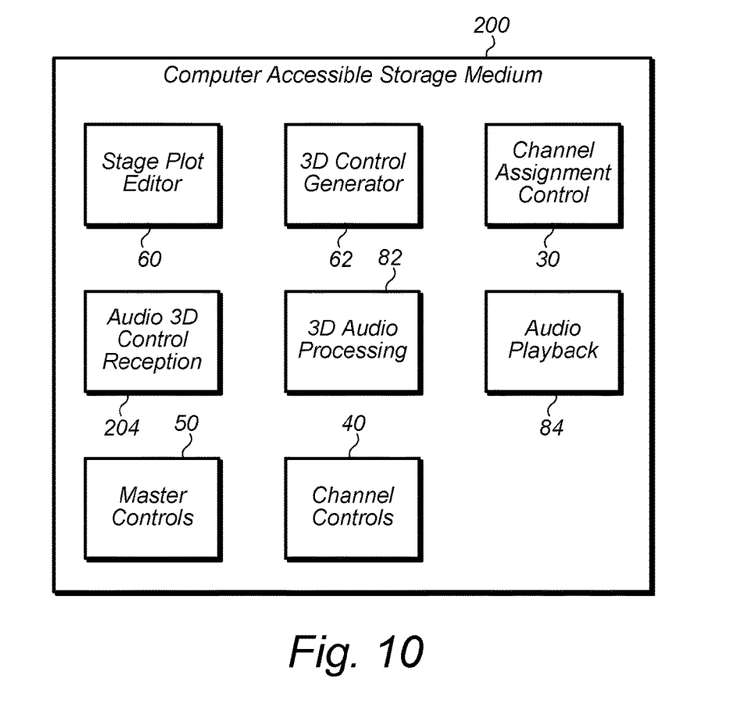
FIG. 10 is a block diagram of one embodiment of a computer accessible storage medium.

FIG. 10 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

In the context of FIG. 10, the computer 12 may be the musicians' portable device 16 or the monitor engineer's portable device 16, in some cases. In such embodiments, the computer accessible storage medium 200 may be, for example, Flash memory and/or RAM in the device. Other mobile devices may include various optical or magnetic storage media.

The computer accessible storage medium 200 in FIG. 10 may store one or more of the stage plot editor 60, the 3D control generator 62, the channel assignment control 30, the audio and 3D control reception 204, the 3D audio processing 82, the audio playback 84, the master controls 50, and the channel controls 40 as described above. The stage plot editor 60, the 3D control generator 84, and the channel assignment control 30 may be software modules implemented on the monitor engineer's portable device 16, in an embodiment. The audio and 3D control reception 204 (part of the network interface 80), the 3D audio processing 82, the master controls 50, the channel controls 40, and the audio playback 84 may be software modules implemented on the musician's portable device(s) 16, in one embodiment. The software modules may comprise instructions which, when executed on the corresponding device, may implement the operation described above for each module.

Numerous variations and modifications will become apparent to those skilled in the art once the above disclosure is fully appreciated. It is intended that the following claims be interpreted to embrace all such variations and modifications.

What is claimed is:

1. A system comprising:
a first device configured to accept input indicating physical positions of a plurality of band members on a stage, wherein the first device is configured to generate a plurality of control parameters for each channel of a digital audio stream generated based on instruments played by one or more of the plurality of band members and vocals sung by one or more of the plurality of band members, wherein the plurality of control parameters for a given channel are generated based on relative positions of a first band member of the plurality of band members who sources the given channel and each other band member of the plurality of band members; and a plurality of second devices, the plurality of second devices used by respective ones of the plurality of band members, wherein a given device of the plurality of second devices used by a given band member of the plurality of band members is configured to receive a subset of the plurality of control parameters that correspond to the given band member, and wherein the given device is configured to mix the channels of the digital audio stream under control of the subset of the plurality of control parameters and to play a resulting audio mix for the given band member.

2. The system as recited in claim 1 wherein the plurality of control parameters include a left gain and a right gain for each channel of the digital audio stream, wherein the left gain is for a left stereo channel of the resulting audio mix and a right gain is for a right stereo channel of the resulting audio mix, wherein the left gain and the right gain differ from each other for at least some relative positions of band members.

3. The system as recited in claim 2 wherein the plurality of control parameters include a left delay and a right delay for each channel of the digital audio stream, wherein the left delay is for a left stereo channel of the resulting audio mix and a right delay is for a right stereo channel of the resulting audio mix, wherein the left delay and the right delay differ from each other for at least some relative positions of band members.

4. The system as recited in claim 3 wherein a range of the left delay and the right delay is dependent on a speed of sound and a nominal distance between human ears.

5. The system as recited in claim 1 wherein relative positions further include a relative rotation of the one of the plurality of band members to the given band member.

6. The system as recited in claim 5 wherein the relative rotation is determined from an angle of rotation of the given band member and the distance from the one of the plurality of band members to the given band member.

7. The system as recited in claim 1 further comprising a network switch coupled to the first device and the plurality of second devices, wherein the control parameters are transmitted over the network.

8. The system as recited in claim 7 wherein the plurality of second devices are wirelessly coupled to the network switch.

9. The system as recited in claim 7 further comprising a third device coupled to the network switch and configured to transmit the digital audio stream on the network.

10. A non-transitory computer accessible storage medium storing a plurality of instructions which, when executed on a device, cause the device to:
  determine relative positions of a plurality of band members on a stage responsive to physical positions of a plurality of band members on a stage as indicated on a stage plot input to the device; and
  generate a plurality of control parameters for each channel of a digital audio stream generated based on instruments played by one or more of the plurality of band members and vocals sung by one or more of the plurality of band members, wherein the plurality of control parameters for a given channel are based on the relative position of a first band member of the plurality of band members who sources the given channel and each other band member of the plurality of band members, and wherein the plurality of control parameters include a left gain and a right gain for each channel of the digital audio stream, wherein the left gain is for a left stereo channel of the resulting audio mix and a right gain is for a right stereo channel of the resulting audio mix, wherein the left gain and the right gain differ from each other for at least some relative positions of band members.

11. The non-transitory computer accessible storage medium as recited in claim 10 wherein the plurality of control parameters include a left delay and a right delay for each channel of the digital audio stream, wherein the left delay is for a left stereo channel of the resulting audio mix and a right delay is for a right stereo channel of the resulting audio mix, wherein the left delay and the right delay differ from each other for at least some relative positions of band members.

12. The non-transitory computer accessible storage medium as recited in claim 11 wherein a range of the left delay and the right delay is dependent on a speed of sound and a nominal distance between human ears.

13. A non-transitory computer accessible storage medium storing a plurality of instructions which, when executed on a device, cause the device to:
  determine relative positions of a plurality of band members on a stage responsive to physical positions of a plurality of band members on a stage as indicated on a stage plot input to the device; and
  generate a plurality of control parameters for each channel of a digital audio stream generated based on instruments played by one or more of the plurality of band members and vocals sung by one or more of the plurality of band members, wherein the plurality of control parameters for a given channel are based on the relative position of a first band member of the plurality of band members who sources the given channel and each other band member of the plurality of band members, and wherein relative positions further include a relative rotation of the one of the plurality of band members to the given band member.

14. The non-transitory computer accessible storage medium as recited in claim 13 wherein the relative rotation is determined from an angle of rotation of the given band member and the distance from the one of the plurality of band members to the given band member.

15. A non-transitory computer accessible storage medium storing a plurality of instructions which, when executed on a device, cause the device to:
  receive a subset of a plurality of control parameters that correspond to a given band member of a plurality of band members, wherein the given band member is a user of the device, and wherein the plurality of control parameters are generated from relative positions of the plurality of band members on a stage;
  mix channels of a digital audio stream under control of the subset of the plurality of control parameters; and
  play a resulting audio mix for the given band member, wherein the plurality of control parameters include a left gain and a right gain for each channel of the digital audio stream, wherein the left gain is for a left stereo channel of the resulting audio mix and a right gain is for a right stereo channel of the resulting audio mix, wherein the left gain and the right gain differ from each other for at least some relative positions of band members.

16. The non-transitory computer accessible storage medium as recited in claim 15 wherein the plurality of control parameters include a left delay and a right delay for each channel of the digital audio stream, wherein the left delay is for a left stereo channel of the resulting audio mix and a right delay is for a right stereo channel of the resulting audio mix, wherein the left delay and the right delay differ from each other for at least some relative positions of band members.

17. The non-transitory computer accessible storage medium as recited in claim 16 wherein a range of the left delay and the right delay is dependent on a speed of sound and a nominal distance between human ears.

18. A non-transitory computer accessible storage medium storing a plurality of instructions which, when executed on a device, cause the device to:
- receive a subset of a plurality of control parameters that correspond to a given band member of a plurality of band members, wherein the given band member is a user of the device, and wherein the plurality of control parameters are generated from relative positions of the plurality of band members on a stage;
- mix channels of a digital audio stream under control of the subset of the plurality of control parameters; and
- play a resulting audio mix for the given band member, and wherein relative positions further include a relative rotation of the one of the plurality of band members to the given band member.

19. The non-transitory computer accessible storage medium as recited in claim 18 wherein the relative rotation is determined from an angle of rotation of the given band member and the distance from the one of the plurality of band members to the given band member.

\* \* \* \* \*